US010148124B1

(12) United States Patent
Chang et al.

(10) Patent No.: US 10,148,124 B1
(45) Date of Patent: Dec. 4, 2018

(54) UNINTERRUPTED POWER BANK CAPABLE OF SUPPLYING HIGH DC VOLTAGE DURING INTERRUPTION OF MAIN SUPPLY AND PROVIDING AC VOLTAGE AS NORMAL SUPPLY OF THE MAIN SUPPLY

(71) Applicant: CHANNEL WELL TECHNONOGY CO., LTD., Taoyuan (TW)

(72) Inventors: Kuo-Hsiang Chang, Taoyuan (TW); Yi-An Pan, Taoyuan (TW)

(73) Assignee: CHANNEL WELL TECHNOLOGY CO., LTD. (TW)

( * ) Notice: Subject to any disclaimer, the term of this patent is extended or adjusted under 35 U.S.C. 154(b) by 0 days.

(21) Appl. No.: 15/862,633

(22) Filed: Jan. 5, 2018

(51) Int. Cl.
| *H02M 7/28* | (2006.01) |
| *H02J 9/06* | (2006.01) |
| *H02J 3/32* | (2006.01) |
| *H02M 3/28* | (2006.01) |

(52) U.S. Cl.
CPC ............... *H02J 9/061* (2013.01); *H02J 3/32* (2013.01); *H02M 3/285* (2013.01); *H02M 7/28* (2013.01)

(58) Field of Classification Search
CPC .................................. H02J 3/32; H02J 9/061
See application file for complete search history.

(56) References Cited

U.S. PATENT DOCUMENTS

| 5,897,194 A * | 4/1999 | Ham .................... G08B 7/062 |
| | | 200/310 |
| 2002/0195879 A1 * | 12/2002 | Okui .................... H02J 9/062 |
| | | 307/64 |
| 2008/0179956 A1 * | 7/2008 | Jiang .................... H02J 9/061 |
| | | 307/66 |
| 2009/0021079 A1 * | 1/2009 | Johnson, Jr. ........... H02J 9/062 |
| | | 307/68 |
| 2009/0044026 A1 * | 2/2009 | Li ........................ G06F 1/263 |
| | | 713/300 |
| 2011/0064445 A1 * | 3/2011 | Yashiro ............. G03G 15/5004 |
| | | 399/88 |
| 2012/0169280 A1 * | 7/2012 | Chi ........................ H02J 7/04 |
| | | 320/109 |
| 2012/0262964 A1 * | 10/2012 | Chang ............... H02M 3/33576 |
| | | 363/126 |
| 2013/0020872 A1 * | 1/2013 | Kinnard .................. H02J 9/061 |
| | | 307/64 |
| 2013/0088196 A1 * | 4/2013 | Chen .................... B60L 11/1811 |
| | | 320/109 |
| 2013/0169051 A1 * | 7/2013 | Chang .................... H02J 9/061 |
| | | 307/66 |

(Continued)

*Primary Examiner* — Yusef A Ahmed

(57) ABSTRACT

The present invention discloses an uninterrupted power bank, mainly comprising: a first switch, a rectifier, a first power converter, a second switch, a battery unit, a second power converter, a third power converter, a third switch, a fourth switch, and output ports. During a normal supply of a mains supply, an AC power provided by the mains supply is transmitted from the uninterrupted power bank to a back-end power supply device. In the meantime, the AC power is simultaneously converted to a DC power and then stored in the battery unit. When the mains supply is suddenly interrupted, the DC power stored in the battery unit is released and subsequently converted to a 390 VDC power for being supplied to the power supply device. Therefore, this uninterrupted power bank is able to largely reduce the power loss because of supplying DC power to back-end power supply device.

11 Claims, 5 Drawing Sheets

(56) References Cited

U.S. PATENT DOCUMENTS

| | | | |
|---|---|---|---|
| 2013/0229060 A1* | 9/2013 | Chang | H02J 9/061 307/64 |
| 2013/0246815 A1* | 9/2013 | Uehara | H02J 9/061 713/300 |
| 2013/0293012 A1* | 11/2013 | Song | H02J 4/00 307/24 |
| 2013/0307471 A1* | 11/2013 | Ichikawa | H02J 7/007 320/108 |
| 2014/0054964 A1* | 2/2014 | Edelen | H02J 9/062 307/65 |
| 2014/0097680 A1* | 4/2014 | Navarro | H02J 9/06 307/23 |
| 2014/0183958 A1* | 7/2014 | Yeh | H02J 9/062 307/66 |
| 2014/0197778 A1* | 7/2014 | Kim | H01M 10/443 320/107 |
| 2015/0028804 A1* | 1/2015 | Nakashima | H02J 50/12 320/108 |
| 2015/0175021 A1* | 6/2015 | Kim | B60L 11/1812 320/109 |
| 2017/0317525 A1* | 11/2017 | Navarro | H02J 9/061 |
| 2017/0361713 A1* | 12/2017 | Fukushima | B60L 3/0092 |
| 2017/0361716 A1* | 12/2017 | Sato | B60L 11/1803 |
| 2017/0366029 A1* | 12/2017 | McKenna | G08G 1/07 |

* cited by examiner

UNINTERRUPTED POWER BANK CAPABLE OF SUPPLYING HIGH DC VOLTAGE DURING INTERRUPTION OF MAIN SUPPLY AND PROVIDING AC VOLTAGE AS NORMAL SUPPLY OF THE MAIN SUPPLY

BACKGROUND OF THE INVENTION

1. Field of the Invention

The present invention relates to the technology field of uninterrupted power supply devices, and more particularly to an uninterrupted power bank capable of supplying high DC voltage during interruption of main supply and providing AC voltage as normal supply of the main supply.

2. Description of the Prior Art

Uninterrupted power supply (UPS) device is a front-end power management device with characteristics of high stability, high safety and power saving ability. Nowadays, the USP devices have been widely applied in various electrical apparatuses or electronic devices, such as computer host, surveillance system, high-precision electrical equipment, and medical instrument. It is well known that, an electronic device can continuously receive power from one specific USP device during interruption of main supply, therefore the electronic device is prevented from losing data in process or operation even if the main supply is suddenly interrupted.

With reference to FIG. 1, there is provided a stereo diagram of a conventional uninterrupted power supply device. Moreover, FIG. 2 shows a circuit block diagram of the conventional UPS device. From FIG. 1 and FIG. 2, it is understood that the conventional UPS device 1' is electrically connected between a power supply device 3' and main supply 2', and mainly comprises a first switch unit 11', a bidirectional power converter 12' and a battery unit 13'. The first switch unit 11' is switched to be a short-circuit state under the main supply 2' is available, and consequently a first AC power provided by the main supply 2' is transmitted from the UPS device 1' to the power supply 3'. In the meantime, the first AC power is also converted to a first DC power by the bidirectional power converter 12', so as to further store the first DC power in the battery unit 13' for being as a backup power. On the contrary, the first switch unit 11' is switched to be an open-circuit state during the interruption of the main supply 2', meanwhile the battery unit 13' release the backup power by a form of first DC power. As a result, the bidirectional power converter 12' converts the first DC power to a second AC power and then outputs the second AC power to the power supply 3'.

By connecting with the UPS device 1', the power supply can still provide power to electrical instruments 4' (such as computer, printer, and/or loudspeaker) and electronic devices 5' (like desk lamp, mobile phone, and/or telephone) even if the main supply 2' is suddenly interrupted. However, despite the fact that the UPS device 1' shown as FIG. 1 and FIG. 2 is widely used for supplying backup power to the electrical instruments 4', inventors of the present invention still find that the conventional UPS device 1' shows following drawbacks in practical use:

(1) Because there is anyone ideal power converter for completing a power conversion process by 100 percent of conversion efficiency, electronic engineers normally know that there are a few power consumption or loss occurring in the event that the first AC power is converted to the first DC power by the bidirectional power converter 12'. Similarly, power consumption or loss would also be produced when the bidirectional power converter 12' converts the first DC power to the second AC power.

(2) On the other hand, FIG. 2 has indicated that the conventional UPS device 1' fails to directly supply power to the peripheral electronic devices 5' such as desk lamp, mobile phone, and/or telephone. The peripheral electronic devices usually receive power from USB ports of the computer host, and that means the peripheral electronic devices 5' cannot get any power in the case of that the computer host is turned off.

From above descriptions, it is clear that how to develop a low-power-loss uninterrupted power supply (UPS) device capable of supplying power to peripheral electronic devices during interruption of main supply has become an important issue. In view of that, inventors of the present application have made great efforts to make inventive research thereon and eventually provided an uninterrupted power bank capable of supplying high DC voltage during interruption of main supply and providing AC voltage as normal supply of the main supply.

SUMMARY OF THE INVENTION

The primary objective of the present invention is to disclose an uninterrupted power bank capable of supplying high DC voltage during interruption of main supply and providing AC voltage as normal supply of the main supply. The uninterrupted power bank mainly comprising: a first switch, a rectifier, a first power converter, a second switch, a battery unit, a second power converter, a third power converter, a third switch, a fourth switch, and output ports. During a normal supply of a main supply, an AC power provided by the main supply is transmitted from the uninterrupted power bank to a back-end power supply device. In the meantime, the AC power is simultaneously converted to a DC power and then stored in the battery unit. When the main supply is suddenly interrupted, the DC power stored in the battery unit is released and subsequently converted to a 390 VDC power for being supplied to the power supply device. Therefore, compared to the fact that conventional UPS system still provides AC power to back-end power supply device in the case of interruption of main supply, this uninterrupted power bank is able to largely reduce the power loss because of supplying DC power to back-end power supply device.

For achieving the primary objective of the present invention, the inventor of the present invention provides an embodiment for the uninterrupted power bank, which is electrically connected between a power supply device and a main supply, and comprises:

a first switch unit, coupled to the main supply;

a rectifier unit, electrically connected to the first switch unit for converting an AC power provided by the main supply to a first DC power;

a first power conversion unit, electrically connected to the rectifier unit for converting the first DC power to a second DC power;

a second switch unit, electrically connected to the first power conversion unit;

a battery unit, coupled to the first power conversion unit via the second switch unit, and used for storing the second DC power as a backup power;

a second power conversion unit, electrically connected to the first power conversion unit for converting the second DC power to a plurality of third DC powers;

a third power conversion unit, electrically connected to the battery unit and the second switch unit;

a third switch unit, electrically connected between the third power conversion unit and the power supply device; and a plurality of output ports, electrically connected to the second power conversion unit;

wherein the battery unit releases the backup power by a form of the second DC power to the second power conversion unit and to the third power conversion unit in the case of an interruption of the main supply; and wherein the third power conversion unit converts the second DC power to a fourth DC power, and subsequently outputting the fourth DC power to the power supply device through the third switch unit.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an uninterrupted power bank capable of supplying high DC voltage during interruption of main supply and providing AC voltage as normal supplying of the main supply according to the present invention, embodiments of the present invention will be described in detail with reference to the attached drawings hereinafter.

First Embodiment

Figure 3:
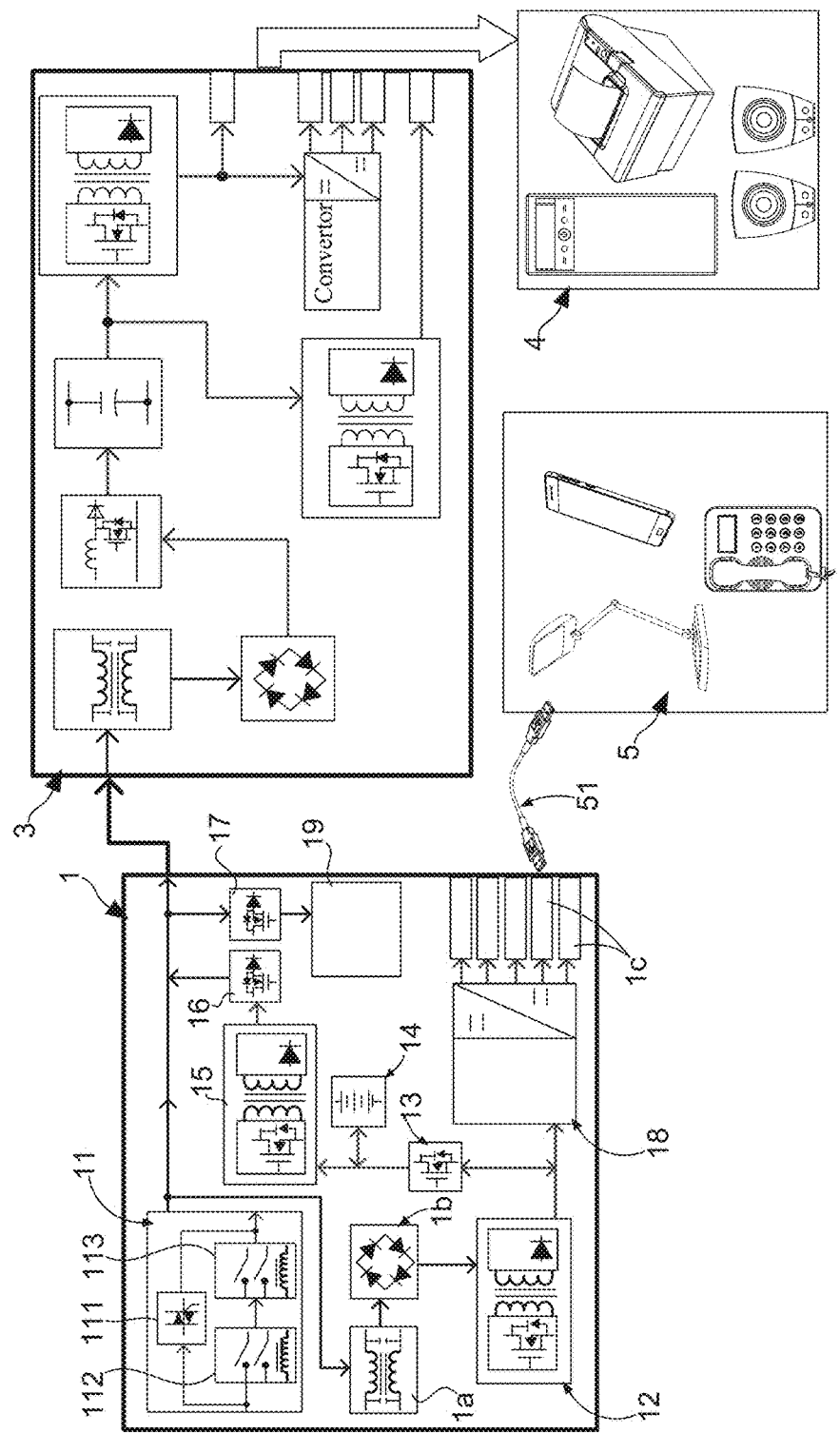
FIG. 3 shows a circuit block diagram of a first embodiment of an uninterrupted power bank according to the present invention.

With reference to FIG. 3, there is provided a circuit block diagram of a first embodiment of an uninterrupted power bank according to the present invention. From FIG. 3, it is understood that the uninterrupted power bank 1 of the present invention is electrically connected between a power supply device 3 and a main supply 2, and comprises: a first switch unit 11, a rectifier unit 1b, a first power conversion unit 12, a second switch unit 13, a battery unit 14, a second power conversion unit 18, a third power conversion unit 15, a third switch unit 16, a fourth switch unit 17, and a plurality of output ports 1c. In first embodiment, the first switch unit 11 consists of a static bypass switch 111, a first relay 112 and a second relay 113, wherein the static bypass switch 111 is selected from the group consisting of silicon-controlled rectifier (SCR), triode AC semiconductor switching element (TRIAC), and insulated gate bipolar transistor (IGBT). On the other hand, the first relay 112 is electrically connected to the static bypass switch 111 in parallel; moreover, the second relay 113 is electrically connected to the first relay 112 in series and also electrically connected to the static bypass switch 111 in parallel.

Figure 4A:
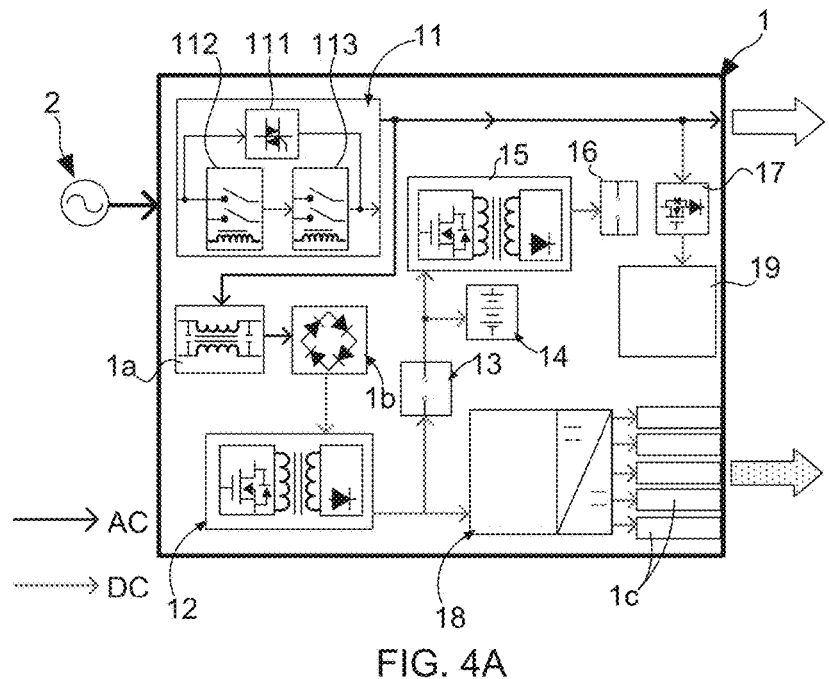
FIG. 4A shows a circuit framework diagram for depicting the operation of the uninterrupted power bank under a normal supply of main supply.

Continuously referring to FIG. 3, and please simultaneously refer to FIG. 4A, which illustrates a circuit framework diagram for depicting the operation of the uninterrupted power bank 1 under a normal supply of the main supply 2. After comparing FIG. 4A with FIG. 3, it is found that, the static bypass switch 111 is switched to be an open-circuit state as well as both the relay contact in the first relay 112 and that of the second relay 113 are closed while the main supply is available. In the meantime, the power supply device 3 receives an AC power from the main supply 2 via the uninterrupted power bank 1. In other words, the uninterrupted power bank 1 of the present invention provides an AC power to the power supply 3 during the normal supply of the main supply 2.

Engineers skilled in development and manufacture of power supply devices normally know that, the power supply device 3 is configured for converting the AC power to multi DC powers, and then provides necessary driving power to electronic instruments 4 such as computer host, printer and loudspeaker. As FIG. 4A shows, the rectifier unit 1b is electrically connected to the first switch unit 11 for converting the AC power provided by the main supply 2 to a first DC power, and the first power conversion unit 12 is electrically connected to the rectifier unit 1b for converting the first DC power to a second DC power. Subsequently, since the battery unit 14 is electrically connected to the first power conversion unit 12 via the second switch unit 13, the second DC power is transmitted to the battery unit 14 for being stored as a backup power in the case of that the second switch unit 13 is switched to be an open-circuit state. In the meantime, the second DC power is simultaneously transmitted to the second power conversion unit 18. Consequently, as FIG. 3 and FIG. 4 show, the second power conversion unit 18 converts the second DC power to a plurality of third DC powers, and then outputs the third DC powers to various electronic devices 5 such as lamp, mobile phone and telephone through the plurality of output ports 1c. Of course, some of the electronic devices 5 receive the third DC powers (i.e., device driving powers) from the output ports 1c by the use of electrical cable 51 with two connectors.

In briefly, when the main supply is available, the uninterrupted power bank 1 of the present invention is configured to transmit the AC power of the main supply 2 to the power supply 3, and the same time convert the AC power to a form of DC power so as store the DC power in the battery unit 14 as a backup power. Moreover, it is worth emphasizing that, this uninterrupted power bank 1 can also supply multi low-voltage DC powers to various electronic devices 5 by the second power conversion unit 18 and the plurality of output ports 1c thereof. The said output ports 1c may be different electrical connectors or an identical electrical connector, wherein practicable electrical connectors for being used as the output ports 1c are listed in following Table (1).

TABLE (1)

| Types of output ports | Corresponding electrical connectors |
|---|---|
| Low-voltage outputting port meeting USB standards | USB 2.X, USB 3.X, USB Type C PD (power delivery), or USB Type C MPD (mobile periphery delivery) |

TABLE (1)-continued

| Types of output ports | Corresponding electrical connectors |
| --- | --- |
| Low-voltage outputting port meeting standards of quick charge (QC) technology | DC-charging electrical connector, USB QC connector, or Lightning QC connector. |
| Low-voltage outputting port meeting DC Jack standards | DC Jack |

It needs to further emphasize that, the practicable electrical connectors listed in Table (1) does not used for being limitations of the uses or the applications of the output ports 1c. For instance, a first type of electrical connector meeting USB standards or standards of QC technology can be used as the output port 1c for proving device driving power to a mobile phone. Moreover, a second type of electrical connector meeting USB standards or USB Type-C PD standards can also be used as the output port 1c for proving device driving power to a laptop computer. On the other hand, a third type of electrical connector meeting USB Type-C MPD standards can be used as the output port 1c for proving device driving power to a computer display. Besides, a fourth type of electrical connector meeting USB standards or DC Jack standards can also be used as the output port 1c for proving device driving power to a luminous device.

In FIG. 4A, gray lines with arrowhead show the transmission paths of DC power, and black lines with arrowhead present the transmission paths of AC power. In addition, the uninterrupted power bank 1 further comprises an EMI filter unit 1a and a high-voltage discharging unit 19, wherein the EMI filter unit 1a is electrically connected between the first switch unit 11 and the rectifier unit 1b, and the high-voltage discharging unit 19 is electrically connected to the fourth switch 17. After comparing FIG. 4A with FIG. 3, it is understood that the third switch 16 and the fourth switch unit 17 are respectively switched to be an open-circuit state and a short-circuit state during the normal supply of the main supply 2, such that the AC power is inputted to the power supply device 3 via the first switch unit 11. Moreover, in the meantime, high-voltage surges carried by the AC power are discharged by the fourth switch unit 17 and the high-voltage discharging unit 19.

Figure 4B:
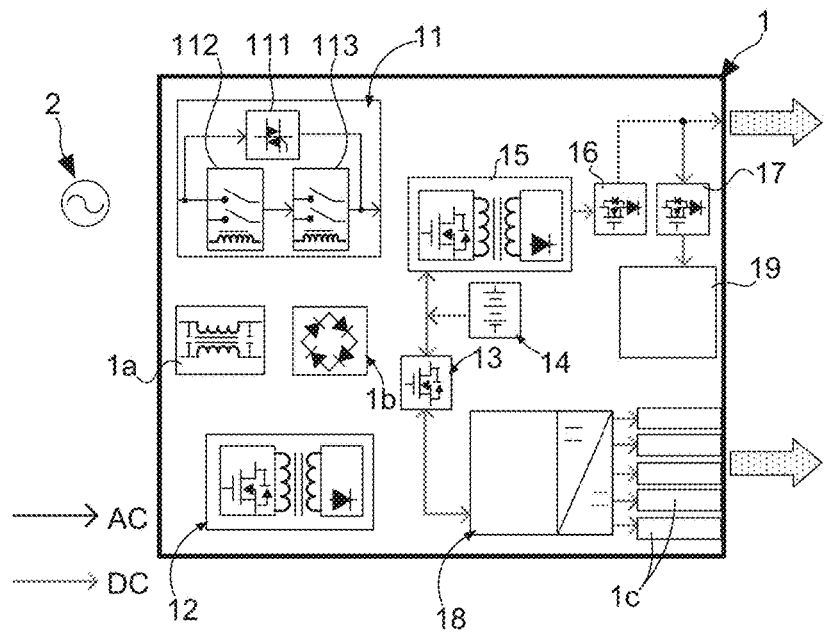
FIG. 4B shows a circuit framework diagram for depicting the operation of the uninterrupted power bank under an interruption of main supply.

Continuously referring to FIG. 3, and please simultaneously refer to FIG. 4B, which illustrates a circuit framework diagram for depicting the operation of the uninterrupted power bank 1 under an interruption of the main supply 2. After comparing FIG. 4B with FIG. 3, it is found that, the static bypass switch 111 is switched to be a short-circuit state as well as both the relay contact in the first relay 112 and that of the second relay 113 are opened while the main supply is suddenly interrupted. In the meantime, the battery unit 14 releases the backup power by a form of the second DC power to the third power conversion unit 15. Subsequently, the third power conversion unit 15 converts the second DC power to a fourth DC power. As a result, the fourth DC power is converted to multi device driving powers by the power supply device 3 for the electronic instruments 4 such as computer host, printer and loudspeaker.

In briefly, when the main supply is interrupted, the uninterrupted power bank 1 of the present invention is configured to convert the second power released from battery unit 15 to a 390 VDC power (i.e., the forth DC power), such that the power supply device 3 converts the 390 VDC power to multi device driving power for various electronic instruments 4. It is worth noting that, by supplying the 390 VDC voltage to the power supply device 3, power factor correction (PFC) unit in the power supply device 3 is configured to stopping operation in the event that the 390 VDC power is applied with a power conversion process. As a result, power consumption or loss induced by the operation of power switches and/or magnetic elements can be globally prevented. In addition, by the supplying of the 390 VDC power, not only does the power efficiency of the power supply device 3 is enhanced, but the power supplying time of the battery unit 14 is also elongated.

Moreover, the second DC power is simultaneously transmitted to the second power conversion unit 18 during the interruption of the main supply 2. According to the particular design of the present invention on the uninterrupted power bank 1, the second power conversion unit 18 is adopted for converting the second DC power released from the battery unit 14 to a plurality of third DC powers (i.e., low-voltage DC powers), and subsequently outputting the low-voltage DC powers to various electronic devices 5 such as smart phone, laptop computer, computer display, lighting device, and telephone.

In FIG. 4B, gray lines with arrowhead show the transmission paths of DC power, and black lines with arrowhead present the transmission paths of AC power. Besides, in the first embodiment of the uninterrupted power bank 1, both the first power conversion unit 12 and the third power conversion unit 15 are an isolated power converter such as flyback power converter, forward power converter, full bridge power converter, or push-pull power converter. However, on the contrary, the second power conversion unit 18 is a non-isolated power converter like buck DC/DC converter. On the other hand, each of the second switch unit 13, the third switch unit 16 and the fourth switch unit 17 is a static bypass switch.

Second Embodiment

Figure 5:
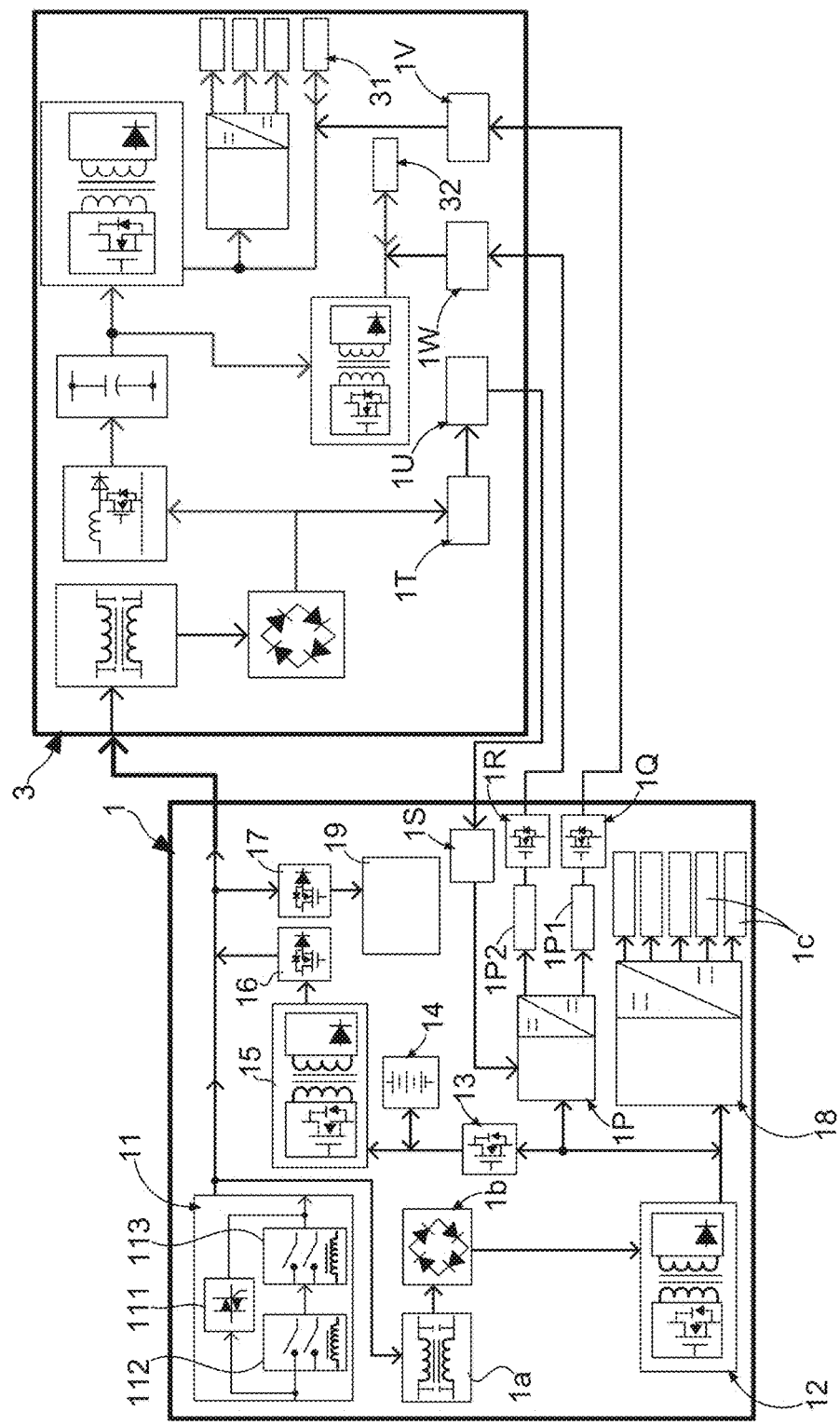
FIG. 5 shows a circuit block diagram of a second embodiment of the uninterrupted power bank according to the present invention.

With reference to FIG. 5, there is provided a circuit block diagram of a second embodiment of the uninterrupted power bank according to the present invention. After comparing FIG. 5 with FIG. 3, it is understood that the second embodiment of the uninterrupted power bank 1 further comprises: a fourth power conversion unit 1P, a main voltage outputting port 1P1, a standby voltage outputting port 1P2, a fifth switch unit 1Q, a sixth switch unit 1R, and a control unit 1S.

As FIG. 5 shows, the fourth power conversion unit 1P is electrically connected to the second switch unit 13 and the first power conversion unit 12 for converting the second DC power to a fifth DC power. Moreover, both the main voltage outputting port 1P1 and the standby voltage outputting port 1P2 are electrically connected to the fourth power conversion unit 1P. In addition, the fifth switch unit 1Q is electrically connected to the main voltage outputting port 1P1 and a first input port 1V of the power supply device 3, and the sixth switch unit 1R is electrically connected to the standby voltage outputting port 1P2 and a second input port 1W of the power supply device 3. It is worth noting that the control unit 1S is electrically connected to the fourth power conversion unit 1P, the fifth switch unit 1Q and sixth switch unit 1R. By such circuit arrangement, when the main supply 2 is interrupted, an interruption warning unit 1T in the power supply device 3 generates an interruption warning signal and subsequently transmits the interruption warning signal to the control unit 1S through a signal outputting port 1U thereof, such that the control unit 1S controls the fourth power conversion unit 1P to output a main voltage (+12V) and a standby voltage (+5 VSB) to the first input port 1V and the second input port 1W via the main voltage outputting port 1P1 and the standby voltage outputting port 1P2, respectively.

Figure 1:
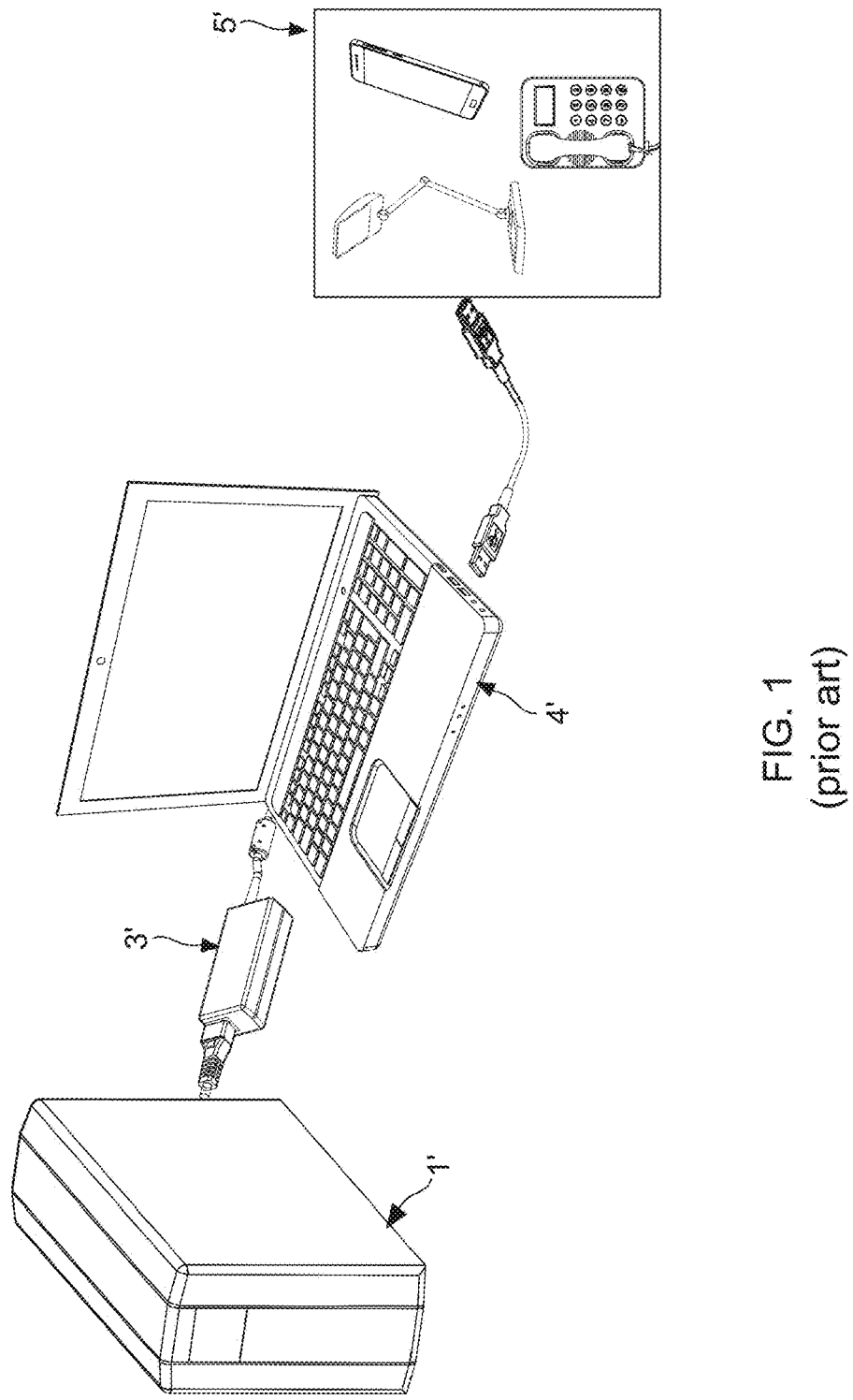
FIG. 1 shows a stereo diagram of a conventional uninterrupted power supply device.
Figure 2:
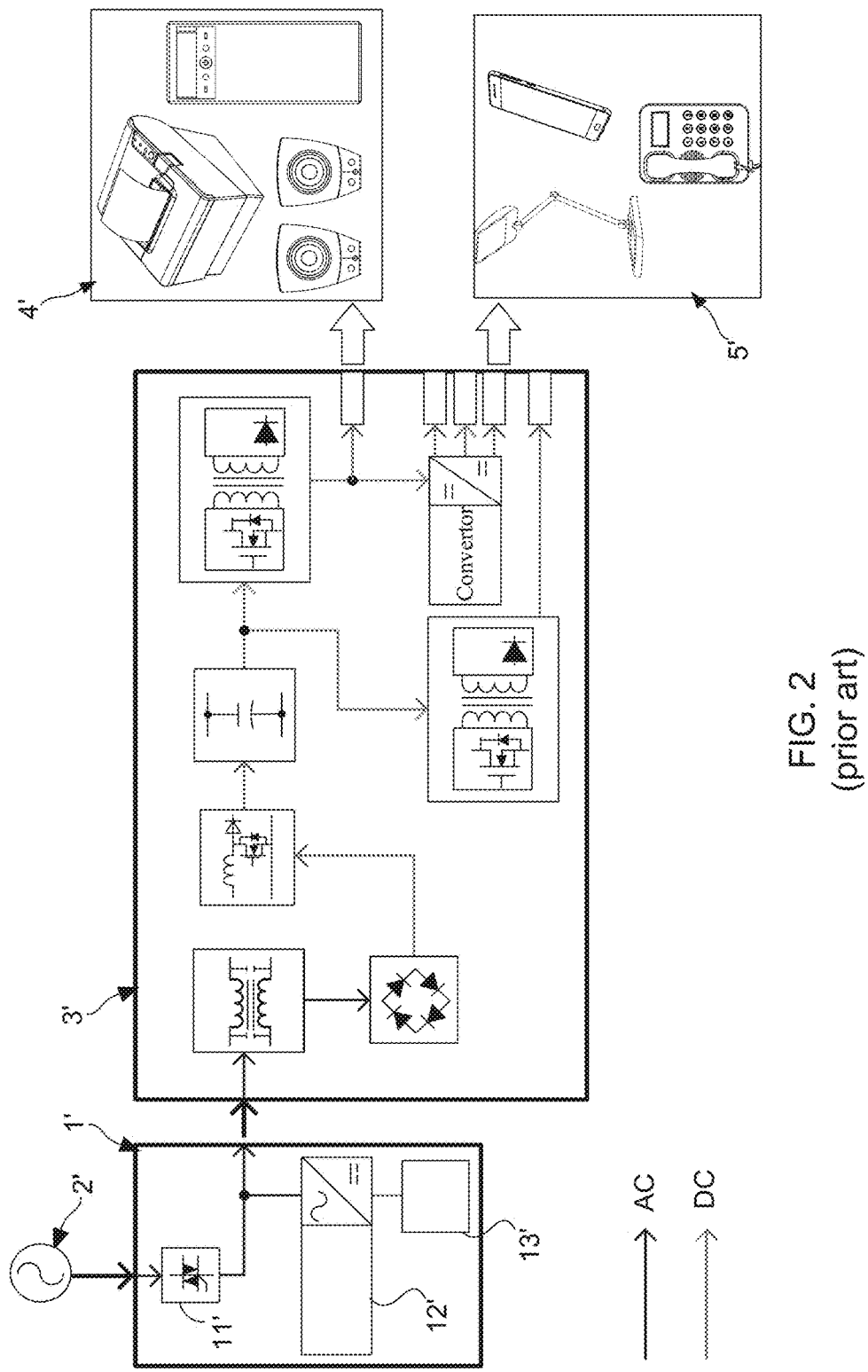
FIG. 2 shows a circuit block diagram of the conventional UPS device.

Therefore, through above descriptions, all embodiments and their constituting elements of the uninterrupted power bank 1 proposed by the present invention have been introduced completely and clearly; in summary, the present invention includes the advantages of:

(1) FIG. 2 shows a circuit block diagram of A conventional UPS device 1'. Because there is anyone ideal power converter for completing a power conversion process by 100 percent of conversion efficiency, electronic engineers normally know that there are a few power consumption or loss occurring in the event that the first AC power is converted to the first DC power by the bidirectional power converter 12'. Similarly, power consumption or loss would also be produced when the bidirectional power converter 12' converts the first DC power to the second AC power. Accordingly, the present invention discloses an uninterrupted power bank 1, comprising: a first switch unit 11, a rectifier unit 1b, a first power conversion unit 12, a second switch unit 13, a battery unit 14, a second power conversion unit 18, a third power conversion unit 15, a third switch unit 16, a fourth switch unit 17, and a plurality of output ports 1c. During a normal supply of a main supply 2, an AC power provided by the main supply 2 is transmitted from the uninterrupted power bank 1 to a back-end power supply device 3. In the meantime, the AC power is simultaneously converted to a DC power and then stored in the battery unit 14. On the other hand, when the main supply 2 is suddenly interrupted, the DC power stored in the battery unit 14 is released and subsequently converted to a 390 VDC power for being supplied to the power supply device 3. Therefore, compared to the fact that conventional UPS system 1' still provides AC power to its back-end power supply device in the case of interruption of main supply, this uninterrupted power bank 1 is able to largely reduce the power loss because of supplying DC power to the back-end power supply device 3.

(2) Moreover, FIG. 2 has also indicated that the conventional UPS device 1' fails to directly supply device driving powers to various peripheral electronic devices 5' such as desk lamp, mobile phone, and/or telephone. Accordingly, the present invention particularly arranges the second power conversion unit 18 in the uninterrupted power bank 1, wherein the second power conversion unit 18 is adopted for converting the second DC power released from the battery unit 14 to a plurality of third DC powers (i.e., low-voltage DC powers), and subsequently outputting the low-voltage DC powers to various electronic devices 5.

(3) It needs further emphasize that, the second embodiment of the uninterrupted power bank 1 further comprises: a fourth power conversion unit 1P, a main voltage outputting port 1P1, a standby voltage outputting port 1P2, a fifth switch unit 1Q, a sixth switch unit 1R, and a control unit 1S. Particularly, the main voltage outputting port 1P1 is electrically connected to a first input port 1V of the power supply device 3 in parallel, and the standby voltage outputting port 1P2 is electrically connected to a second input port 1W of the power supply device 3 in parallel. By such circuit arrangement, when the output voltage of the power supply device 3 suddenly reduce due to dynamic load effect, a main a main voltage (+12V) and a standby voltage (+5 VSB) generated by the fourth power conversion unit 1P would immediately facilitate support the power supply device 3 providing full voltage output.

(4) Inheriting to above point (3), it is well known that the dynamic load effect would lead the magnetic elements in the power supply device 3 to make an audible and discomfort noise. Therefore, because the second embodiment of the uninterrupted power bank 1 is helpful to improve the dynamic load effect of the power supply device 3, it is believed that the audible noise would be simultaneously canceled. In addition, by respectively outputting the main voltage (+12V) and the standby voltage (+5 VSB) to the first input port 1V and the second input port 1W of the power supply device 3, not only does the power supply device 3 is facilitated able to provide full voltage output, but the ripples and noises carried by the output voltages of the power supply device 3 are also globally attenuated.

The above description is made on embodiments of the present invention. However, the embodiments are not intended to limit scope of the present invention, and all equivalent implementations or alterations within the spirit of the present invention still fall within the scope of the present invention.

What is claimed is:

1. An uninterrupted power bank, being electrically connected between a power supply device and a main supply, and comprising:
  a first switch unit, being coupled to the main supply;
  a rectifier unit, being electrically connected to the first switch unit for converting an AC power provided by the main supply to a first DC power;
  a first power conversion unit, being electrically connected to the rectifier unit for converting the first DC power to a second DC power;
  a second switch unit, being electrically connected to the first power conversion unit;
  a battery unit, being electrically connected to the first power conversion unit via the second switch unit, and used for storing the second DC power as a backup power;
  a second power conversion unit, being electrically connected to the first power conversion unit for converting the second DC power to a plurality of third DC powers;
  a third power conversion unit, being electrically connected to the battery unit and the second switch unit;
  a third switch unit, being electrically connected between the third power conversion unit and the power supply device; and
  a plurality of output ports, being electrically connected to the second power conversion unit;
  wherein the battery unit releases the backup power by a form of the second DC power to the second power conversion unit and to the third power conversion unit in the case of an interruption of the main supply; and
  wherein the third power conversion unit converting the second DC power to a fourth DC power, and subsequently outputting the fourth DC power to the power supply device through the third switch unit.

2. The uninterrupted power bank of claim 1, further comprising:
  a fourth switch unit, being electrically connected to the first switch unit; and
  a high-voltage discharging unit, being electrically connected to the fourth switch;
  wherein the third switch and the fourth switch unit are respectively switched to be an open-circuit state and a short-circuit state during a normal supply of the main supply, such that the AC power is inputted to the power supply device via the first switch unit; and wherein high-voltage surges carried by the AC power being discharged by the fourth switch unit and the high-voltage discharging unit.

3. The uninterrupted power bank of claim 2, further comprising:
- a fourth power conversion unit, being electrically connected to the second switch unit and the first power conversion unit for converting the second DC power to a fifth DC power;
- a main voltage outputting port, being electrically connected to the fourth power conversion unit;
- a standby voltage outputting port, being electrically connected to the fourth power conversion unit;
- a fifth switch unit, being electrically connected to the main voltage outputting port;
- a sixth switch unit, being electrically connected to the standby voltage outputting port; and
- a control unit, being electrically connected to the fourth power conversion unit, the fifth switch unit and sixth switch unit;
- wherein the fifth switch unit and sixth switch unit are also electrically connected to a first input port and a second input port of the power supply device, respectively;
- wherein when the main supply is interrupted, the power supply device generating an interruption warning signal and subsequently transmitting the interruption warning signal to the control unit through a signal outputting port thereof, such that the control unit controls the fourth power conversion unit to output a main voltage and a standby voltage to the first input port and the second input port via the main voltage outputting port and the standby voltage outputting port, respectively.

4. The uninterrupted power bank of claim 2, wherein each of the second switch unit, the third switch unit and the fourth switch unit is a static bypass switch.

5. The uninterrupted power bank of claim 1, further comprising:
- an electromagnetic interference (EMI) filter unit, being electrically connected between the first switch unit and the rectifier unit.

6. The uninterrupted power bank of claim 5, wherein the static bypass switch is selected from the group consisting of silicon-controlled rectifier (SCR), triode AC semiconductor switching element (TRIAC), and insulated gate bipolar transistor (IGBT).

7. The uninterrupted power bank of claim 1, wherein the first switch unit comprises:
- a static bypass switch;
- a first relay, being electrically connected to the static bypass switch in parallel; and
- a second relay, being electrically connected to the first relay in series, and also electrically connected to the static bypass switch in parallel.

8. The uninterrupted power bank of claim 1, wherein the second power conversion unit is a non-isolated power converter.

9. The uninterrupted power bank of claim 1, wherein both the first power conversion unit and the third power conversion unit are isolated power converters.

10. The uninterrupted power bank of claim 9, wherein the isolated power converters are selected from the group consisting of flyback power converter, forward power converter, full bridge power converter, and push-pull power converter.

11. The uninterrupted power bank of claim 1, wherein the plurality of output ports is selected from the group consisting of USB connector, electrical connector meeting standards of quick charge (QC) technology, and Lightning connector.

* * * * *